(12) United States Patent
Harada et al.

(10) Patent No.: US 11,395,158 B2
(45) Date of Patent: Jul. 19, 2022

(54) USER TERMINAL, BASE STATION AND RADIO COMMUNICATION METHOD

(71) Applicant: NTT DOCOMO, INC., Tokyo (JP)

(72) Inventors: Hiroki Harada, Tokyo (JP); Yousuke Sano, Tokyo (JP); Daiki Takeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/754,566

(22) PCT Filed: Oct. 2, 2018

(86) PCT No.: PCT/JP2018/036892
§ 371 (c)(1),
(2) Date: Apr. 8, 2020

(87) PCT Pub. No.: WO2019/073862
PCT Pub. Date: Apr. 18, 2019

(65) Prior Publication Data
US 2020/0260299 A1   Aug. 13, 2020

(30) Foreign Application Priority Data
Oct. 11, 2017   (JP) .............................. JP2017-208619

(51) Int. Cl.
*H04W 24/02*   (2009.01)
*H04W 48/10*   (2009.01)
(Continued)

(52) U.S. Cl.
CPC .......... *H04W 24/02* (2013.01); *H04W 48/10* (2013.01); *H04W 56/0015* (2013.01); *H04W 84/042* (2013.01)

(58) Field of Classification Search
CPC . H04W 24/02; H04W 56/0015; H04W 48/10; H04W 84/042
See application file for complete search history.

(56) References Cited

U.S. PATENT DOCUMENTS

| | | | |
|---|---|---|---|
| 2019/0053177 A1* | 2/2019 | Niu | H04L 27/261 |
| 2020/0100229 A1* | 3/2020 | Chen | H04W 72/042 |
| 2021/0160120 A1* | 5/2021 | Yi | H04W 72/0453 |

OTHER PUBLICATIONS

3GPP TS 36.300 V8.12.0 "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)" Mar. 2010 (149 pages).

(Continued)

*Primary Examiner* — Wayne H Cai
(74) *Attorney, Agent, or Firm* — Osha Bergman Watanabe & Burton LLP

(57) ABSTRACT

A terminal is disclosed including a processor that controls reception of a first synchronization signal (PSS), a second synchronization signal (SSS), and a broadcast channel (PBCH) in a predetermined block that is formed by a predetermined number of symbols and a predetermined number of subcarriers; and a receiver that receives the PSS, the SSS and the PBCH that form the predetermined block, wherein the PSS and the SSS are located in a first frequency domain, wherein the PBCH is located in at least part of a second frequency domain that is broader than the first frequency domain, and wherein the PBCH is located in at least part of a first predetermined domain neighboring the SSS in the frequency direction in the predetermined block and the PBCH is not located in a second predetermined domain neighboring the PSS in the frequency direction in the predetermined block.

11 Claims, 14 Drawing Sheets

(51) Int. Cl.
*H04W 56/00* (2009.01)
*H04W 84/04* (2009.01)

(56) References Cited

OTHER PUBLICATIONS

3GPP TSG RAN WG1 Meeting #90bis; R1-1717459 "Remaining issues for SSB design" Vivo; Prague, Czech Republic; Oct. 9-13, 2017 (6 pages).
3GPP TSG-RAN WG1 #87; R1-1612289 "Efficient design of SS block" ASTRI, TCL Communication Ltd.; Reno, US; Nov. 14-18, 2016 (7 pages).
3GPP TSG RAN WG1 Meeting #91; R1-1720789 "Remaining details on Synchronization signal" NTT DOCOMO, Inc.; Reno, USA; Nov. 27-Dec. 1, 2017 (5 pages).
International Search Report issued in International Application No. PCT/JP2018/036892, dated Dec. 25, 2018 (5 pages).
Written Opinion issued in International Application No. PCT/JP2018/0036892; dated Dec. 25, 2018 (4 pages).
Office Action issued in the counterpart Pakistani Patent Application No. 686/2018, dated Aug. 6, 2019 (2 pages).
Office Action issued in the counterpart Bangladeshi Patent Application No. 283/2018/621, dated Mar. 9, 2019 (1 page).
Office Action in counterpart Pakistanian Application No. 686/2018 dated Aug. 12, 2021 (2 pages).
Extended European Search Report issued in counterpart European Patent Application No. 18866916.2, dated Jun. 9, 2021 (9 pages).
ASTRI, TCL Communication Ltd.; "Efficient design of SS block"; 3GPP TSG-RAN WG1 #87, R1-1612289; Reno, US; Nov. 14-18, 2016 (7 pages).
Vivo; "Remaining issues for SSB design"; 3GPP TSG RAN WG1 Meeting #90bis, R1-1717459; Prague, Czech Republic; Oct. 9-13, 2017 (6 pages).
Intel Corporation; "NR PBCH Structure"; 3GPP TSG RAN WG1 Meeting RAN1 #88, R1-1702181; Athens, Greece; Feb. 13-17, 2017 (7 pages).
Office Action issued in Taiwanese Application No. 107135556; dated Jul. 27, 2021 (16 pages).

* cited by examiner

USER TERMINAL, BASE STATION AND RADIO COMMUNICATION METHOD

TECHNICAL FIELD

The present disclosure relates to a user terminal and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). Also, the specifications of LTE-A (also referred to as "LTE-advanced," "LTE Rel. 10," "LTE Rel. 11," "LTE Rel. 12" or "LTE Rel. 13") have been drafted for further broadbandization and increased speed beyond LIE (also referred to as "LTE Rel. 8" or "LTE Rel. 9"), and successor systems of LTE (also referred to as, for example, "FRA (Future Radio Access)," "5G (5th generation mobile communication system)," "NR (New Radio)," "NX (New radio access)," "FX (Future generation radio access)," "LTE Rel. 14," "LTE Rel. 15" or later versions) are under study.

In LTE Rel. 10/11, carrier aggregation (CA) to integrate multiple component carriers (CC) is introduced in order to achieve broadbandization. Each CC is configured with the system bandwidth of LTE Rel. 8 as one unit. In addition, in CA, multiple CCs under the same radio base station (eNB (eNodeB)) are configured in a user terminal (UE (User Equipment)).

Meanwhile, in LTE Rel. 12, dual connectivity (DC), in which multiple cell groups (CGs) formed with different radio base stations are configured in a UE, is also introduced. Each cell group is comprised of at least one cell (or CC). In DC, since multiple CCs of different radio base stations are integrated, DC is also referred to as "inter-eNB CA."

Also, in existing LTE systems (for example, LTE Rels. 8 to 13), synchronization signals (PSS/SSS), broadcast channels (PBCHs) and so on which a user terminal uses in initial access procedures are allocated, on a fixed basis, in domains that are determined in advance. By detecting the synchronization signals in cell search, the user terminal can establish synchronization with the network, and, furthermore, identify the cell (for example, cell ID) which the user terminal should connect with. Furthermore, the user terminal can acquire system information by receiving broadcast channels (PBCHs and SIBs) after the cell search.

CITATION LIST

Non-Patent Literature

Non-Patent Literature 1: 3GPP TS36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

Future radio communication systems (for example, 5G, NR, etc.) are expected to realize various radio communication services so as to fulfill mutually varying requirements (for example, ultra high speed, large capacity, ultra-low latency, etc.). For example, regarding 5G/NR, studies are in progress to provide radio communication services, referred to as "eMBB (enhanced Mobile Broad Band)," "IoT (Internet of Things)," "mMTC (massive Machine Type Communication)," "M2M (Machine To Machine)," and "URLLC (Ultra Reliable and Low Latency Communications)."

In addition, 5G/NR is expected to support flexible use of numerologies and frequencies, and realize dynamic frame configurations. Here, "numerology" refers to communication parameters in the frequency direction and/or the time direction (for example, at least one of the subcarrier spacing (subcarrier interval), the bandwidth, the symbol duration, the time duration of CPs (CP duration), the subframe duration, the time duration of TTIs (TTI duration), the number of symbols per TTI, the radio frame configuration, the filtering process, the windowing process, and so on).

However, how to control transmission/receipt of signals when different numerologies (subcarrier spacing, bandwidth etc.) from those of existing LTE systems are supported is a problem. In 5G/NR, a study is in progress to provide services using a very high carrier frequency of 100 GHz, and on the assumption that DL transmission is performed using different methods from those of existing LTE systems.

For example, DL signals such as synchronization signals for use for initial access and/or other events and broadcast channels are anticipated to be transmitted based on different configurations (for example, different mapping methods) from those of existing LTE systems. In this case, it is desirable to use signal configurations that can reduce the load and/or the latency when a UE gains initial access.

It is therefore an object of the present disclosure to provide a user terminal and a radio communication method that can reduce the load and/or the latency of UEs in radio communication systems in which communication is performed using configuration different from those used in existing LTE systems.

Solution to Problem

In accordance with one aspect of the present disclosure, a user terminal has a receiving section configured to receive a first synchronization signal (PSS), a second synchronization signal (SSS), and a broadcast channel (PBCH), and a control section configured to control, in a predetermined block that is formed by a predetermined number of symbols and a predetermined number of subcarriers, reception of the PSS and the SSS which are located in a first frequency domain, and the PBCH which is located in at least part of a second frequency domain that is broader than the first frequency domain, wherein the PBCH is located in the predetermined block in at least part of a predetermined domain that is neighbor with the SSS in the frequency direction, and the PBCH is not located in a predetermined domain that is neighbor with the PSS in the frequency direction.

Advantageous Effects of Invention

According to one aspect of the present disclosure, the load and/or the latency of UEs can be reduced in radio communication systems, in which communication is performed using configuration different from those used in existing LTE systems.

DESCRIPTION OF EMBODIMENTS

Figure 1:
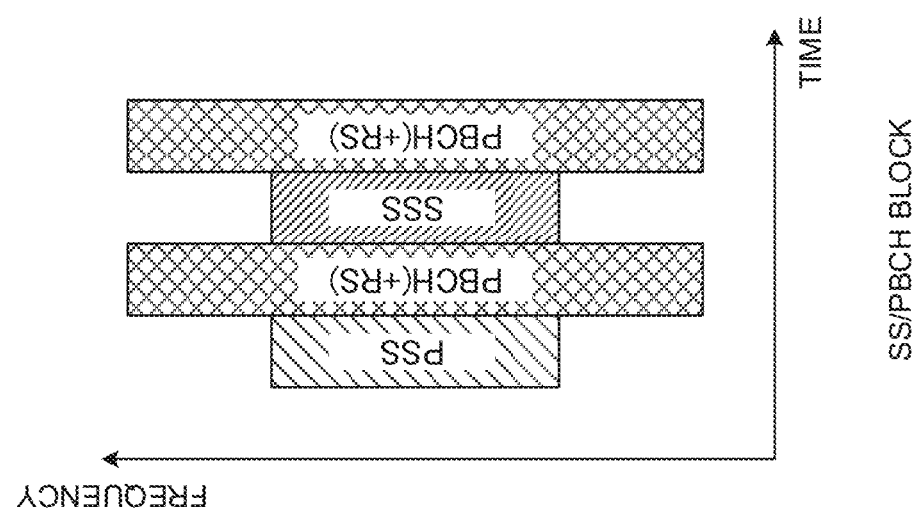
FIG. 1 is a diagram to show an example of an SS/PBCH block.

In the initial access process in existing LTE systems, a user terminal can at least detect time/frequency synchronization and a cell indicator (cell ID) by detecting synchronization signals (PSS/SSS). Also, after having established synchronization with the network and captured the cell ID, the user terminal receives a broadcast channel (for example, PBCH) where system information is included. Following the detection of synchronization signals and demodulation of the broadcast channel, for example, SIBs (System Information Blocks) are received, a PRACH (Physical Random Access Channel) is transmitted, and so on.

As described above, in existing LTE systems, a user terminal receives the system information (broadcast information) that is necessary for downlink communication, in, for example, the MIB (Master Information Block), which is transmitted in a broadcast channel (PBCH). The broadcast channel for existing LTE systems (LTE-PBCH) is transmitted in subframe #0 in each radio frame, in a cycle of 10 msec, in a center band of 1.4 MHz (six RBs in the center).

In PBCH (MIB), the information that is necessary to receive the downlink (downlink bandwidth, downlink control channel configuration, system frame number (SFN), etc.) is set forth using predetermined bits. A user terminal controls receipt of SIBs (System Information Blocks), which are communicated in the downlink shared data channel (PDSCH), based on LTE-PBCH. By receiving SIBs, the user terminal can acquire minimum system information that is necessary to make communication.

Also, the locations to allocate synchronization signals (LTE-PSS/SSS) and broadcast channels (LTE-PBCHs) in existing LTE systems are fixed in time resources and frequency resources. To be more specific, LTE-PSS/SSS and broadcast channels are mapped to the same frequency domain (frequency field, frequency region) (for example, six RBs at the center frequency) and transmitted. Thus, LTE-PSS/SSS and LTE-PBCHs are transmitted from radio base stations in fixed resources, so that LTE-PSS/SSS and LTE-PBCHs can be received without sending a special notice to the user terminal.

Even in future radio communication systems, a user terminal needs to receive synchronization signals and system information (MIB and/or SIB) in the initial access process and so on in order to perform communication using a newly introduced carrier (also referred to as "NR carrier (cell)").

<SS Block>

5G/NR are under study to define a resource unit that is comprised at least of synchronization signals (for example, NR-PSS and/or NR-SSS (hereinafter also referred to as "NR-PSS/SSS")) and a broadcast channel (for example, NR-PBCHs) as an "SS block" or an "SS/PBCH block," and to allow communication using SS/PBCH blocks.

An SS/PBCH block is comprised of a plurality of consecutive OFDM symbols. For example, a symbol for a primary synchronization signal (for example, NR-PSS), a symbol for a secondary synchronization signal (for example, NR-SSS), and a symbol for NR-PBCH are arranged in a row. Furthermore, NR-PBCHs may be arranged or located in a plurality of symbols (for example, in two or three symbols), and, for example, an SS block is constituted by one symbol for NR-PSS, one symbol for NR-SSS and two symbols for NR-PBCHs.

For example, a study is in progress to arrange (locate) NR-PSS, NR-SSS and NR-PBCHs in the order of NR-PSS, NR-PBCH, NR-SSS and NR-PBCH (see FIG. 1). Obviously, the order of arranging synchronization signals and broadcast channels in an SS/PBCH block is not limited to this. It is equally possible to configure an SS/PBCH block to include three or more symbols of NR-PBCHs.

Also, a configuration may be employed here in which NR-PSS/SSS and NR-PBCHs are mapped to different frequency domains (or frequency bands). For example, NR-PSS/SSS may be mapped to a first frequency domain (which is, for example, twelve PRBs (or 127 subcarriers)), and NR-PBCH may be mapped to a second frequency domain (which is, for example, twenty-four PRBs (or 288 subcarriers)), which is wider than the first frequency domain (see FIG. 1).

In this case, NR-PSS/SSS are mapped to 127 subcarriers×1 symbol, and NR-PBCHs are mapped to 288 subcarriers×2 symbols. Also, reference signals (for example, DMRSs) for use for demodulating NR-PBCHs may be mapped to the second frequency domain.

In this way, by configuring the frequency domain for NR-PBCHs wider than the frequency domain for synchronization signals (NR-PSS/NR-SSS), it is possible to secure sufficient resources for NR-PBCHs, which are used to report system information and so on.

The first frequency domain where NR-PSS/SSS is mapped and the second frequency domain where NR-PBCHs are mapped may be arranged so that these domains overlap at least partially (for example, the center regions of allocation match). This will reduce the frequency domain where the UE has to perform SS block receiving processes in initial access, and so on. From the perspective of reducing the frequency domain where the UE has to monitor SS blocks, it is preferable to map NR-PSS/SSS and NR-PBCHs such that the first frequency domain is included in the range of the second frequency domain.

In this way, while research is underway to configure the frequency domain for NR-PBCHs wider than (for example, twice) the frequency domain for synchronization signals, it is more preferable to reduce the number of SS rasters from the perspective of reducing the load and/or the latency of UEs when gaining initial access.

Figure 2:
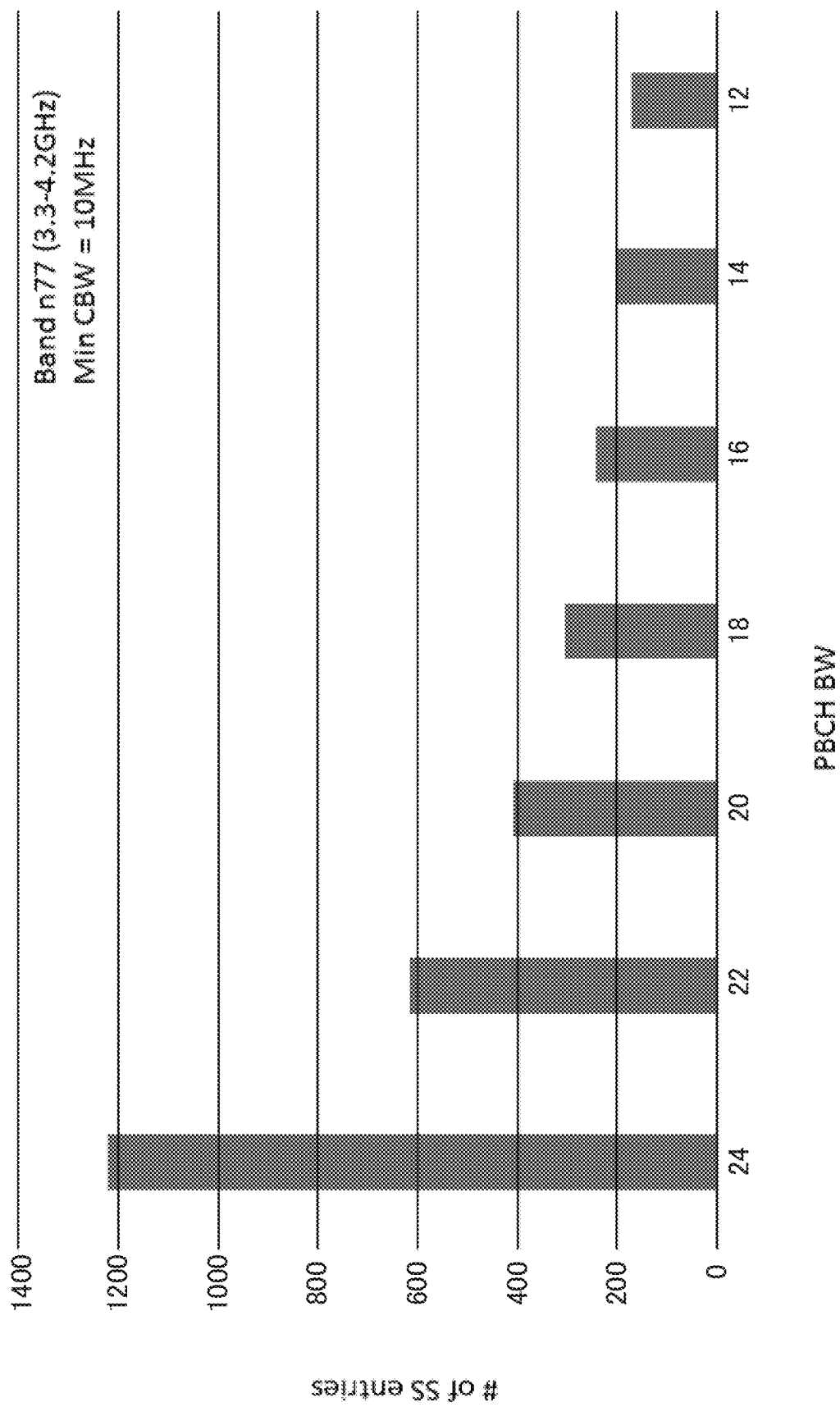
FIG. 2 is a diagram to show an example of the relationship between SS rasters and PBCH bandwidth.

An SS raster refers to a parameter that is determined based on the minimum system bandwidth and the SS/PBCH block bandwidth, and is equivalent to a location in frequency where synchronization signals are searched for when gaining initial access. FIG. 2 shows examples of SS rasters in a predetermined band (band n77: 3.3 to 4.2 GHz, the minimum system bandwidth=10 MHz, etc.).

As shown in FIG. 2, the number of SS rasters increases when the frequency domain (or the bandwidth) for NR-PBCHs is wider (for example, twenty-four PRBs), while the number of SS rasters decreases when the bandwidth for NR-PBCHs narrows. For example, when the bandwidth for NR-PBCHs is configured with twenty-two PRBs, the number of rasters is about half compared to when the bandwidth is comprised of twenty-four PRBs. Also, when the bandwidth for NR-PBCHs is comprised of twenty PRBs (or eighteen PRBs), the number of rasters becomes ⅓ or less compared to when the bandwidth is comprised of twenty-four PRBs. Also, when the bandwidth for NR-PBCHs is comprised of twelve PRBs, the number of rasters becomes ⅙ or less compared to when the bandwidth is comprised of twenty-four PRBs.

Thus, by reducing the bandwidth for NR-PBCHs, it is possible to reduce the number of rasters, and reduce the load and/or the latency of UEs when gaining initial access. In particular, by keeping the bandwidth for NR-PBCHs to less than twice (twenty-four PRBs) the bandwidth for synchronization signals (twelve PRBs), the number of rasters can be reduced effectively.

Meanwhile, reducing the bandwidth for NR-PBCHs in the SS/PBCH block configuration shown in FIG. 1 leads to reducing the number of resources that can be used to transmit NR-PBCHs, so that there is a possibility that the characteristics in transmission and receipt of NR-PBCHs may deteriorate.

The present inventors have focused on the fact that, in the bandwidth where NR-PBCHs are placed, unoccupied resources are produced in resources (for example, neighboring resources) located outside the synchronization signals (for example, NR-PSS and/or NR-SSS) and come up with the idea of transmitting NR-PBCHs using these neighboring resources.

For example, one aspect of the present invention provides, in an SS/PBCH block, synchronization signals (PSS and/or SSS), which are located in a first frequency domain, a first broadcast channel (PBCH), which is located in a second frequency domain that is wider than the first frequency domain, and a second broadcast channel, which is located in at least a part of a predetermined frequency domain (a given frequency domain) that neighbors the first frequency domain. In this case, the synchronization signals and the second broadcast channel may be arranged in the same time domain, and the synchronization signals and the first broadcast channel may be arranged in different time domains.

Accordingly, even when the bandwidth for NR-PBCHs in the configuration shown in FIG. 1 is reduced, resources that neighbor NR-PSS and/or NR-SSS can be used for NR-PBCHs, so that the number of rasters (or the bandwidth for NR-PBCHs) can be reduced, and, at the same time, resources for NR-PBCHs can be secured.

Now, embodiments of the present invention will be described in detail below with reference to the accompanying drawings. Note that the configurations according to each embodiment may be applied individually or may be applied in combination. In the following description, the case where the number of domains (regions) in which NR-PSS and/or NR-SSS are arranged is twelve PRBs will be described as an example, but this is by no means limiting. For example, a configuration in which a synchronization signal is not allocated to some subcarriers among the twelve PRBs may be adopted. Also, it may be possible to form NR-PSS and/or NR-SSS with 127 subcarriers, and arrange the rest of the subcarriers (for example, seventeen subcarriers) at both ends of the synchronization signals (for example, eight subcarriers may be arranged at one end, and nine subcarriers may be arranged at the other end) so as to provide guard subcarriers. Also, although the following description will assume that the center frequencies of PSS/SSS and PBCHs, provided in different frequency domains, are aligned, this is by no means limiting.

(First Aspect)

According to a first aspect of the present invention, the bandwidth of the PBCH (the frequency domain in which the PBCH is arranged) (hereinafter referred to as the "first PBCH") in the SS/PBCH block shown in FIG. 1 is narrowed. Then, a PBCH (hereinafter referred to as a "second PBCH") is placed in at least part of predetermined frequency domains that neighbor a primary synchronization signal (PSS) and a secondary synchronization signal (SSS) (see FIG. 3).

A predetermined frequency domain to neighbor the synchronization signals refers to a domain which does not overlap with the frequency domains where the synchronization signals (PSS and/or SSS) are placed in the frequency band in which the first PBCH is placed. For example, if the bandwidth of the first PBCH is eighteen PRBs and the bandwidth of the PSS and/or the SSS is twelve PRBs, a part of three PRBs that does not overlap with the first PBCH is produced from each end of the PSS and/or the SSS. In this case, these three PRBs are each equivalent to a predetermined frequency domain to neighbor the synchronization signals. Also, a predetermined frequency domain to neighbor a synchronization signals may be referred to as a "nearby domain of a synchronization signal."

Figure 3:
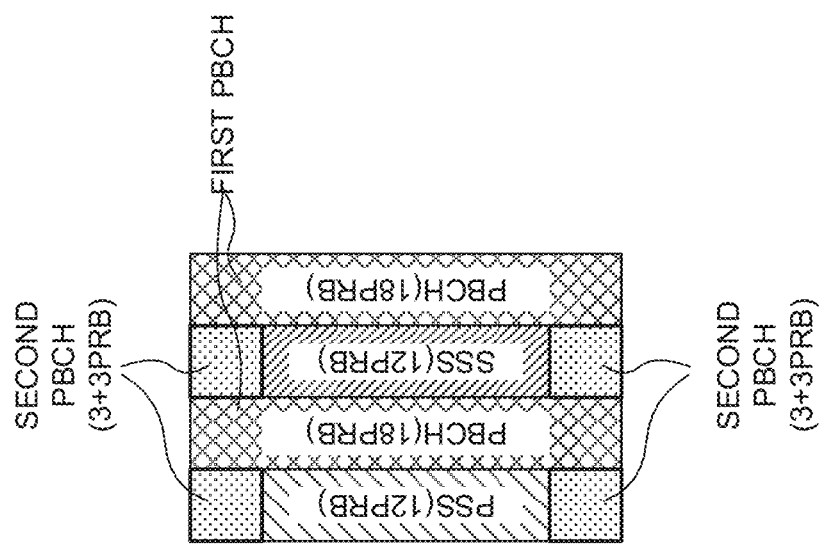
FIG. 3 is a diagram to show an example of an SS/PBCH block according to the present embodiment.
Figure 3:
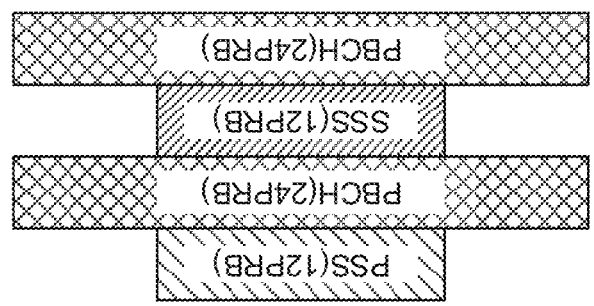

In FIG. 3, the PSS (twelve PRBs), the first PBCH (eighteen PRBs), the SSS (twelve PRBs) and the first PBCH (eighteen PRBs) are sequentially arranged in different time domains (for example symbols). Furthermore, a configuration is shown in which the second PBCH (three PRBs) is placed in the time domain in which the PSS is arranged and in the time domain in which the SSS is arranged.

In FIG. 3, the second PBCH is placed within the range of the frequency domain (or the bandwidth) for the first PBCH. In this case, the UE has only to monitor the bandwidth of the first PBCH (here, eighteen PRBs) to receive the SS/PBCH block when, for example, gaining initial access, so that, compared to the configuration shown in FIG. 1, the bandwidth to monitor can be reduced. Furthermore, by making the bandwidth of the first PBCH shorter than twenty-four PRBs, and, furthermore, by providing a second PBCH additionally, it is possible to reserve resources for use for transmitting PBCHs.

In this way, by reducing the bandwidth of PBCHs and (for example, making the PBCH bandwidth less than twice the bandwidth of the PSS/SSS), and, furthermore, by using part of resources located outside the PSS and the SSS for PBCH transmission, it is possible to reduce the bandwidth of the SS/PBCH block, while securing the amount of resources for use for transmitting PBCHs. This can reduce the number of SS rasters, so that, when, for example, UE gains initial access, the load and/or the latency can be reduced. In addition, because resources to use to transmit PBCHs can be secured, deterioration of communication quality can be reduced.

Note that FIG. 3 shows a case where the second PBCH is arranged by the same amount of resources (for example, the same number of PRBs) in each predetermined frequency domain that neighbors the PSS and the SSS, but this is by no means limiting. The second PBCHs that are arranged in neighboring frequency domains of the PSS and the SSS may be provided varying amounts of resources. For example, second PBCHs, two PRBs each, may be arranged at both ends of the PSS, and second PBCHs, three PRBs each, may be arranged at both ends of the SSS.

(Second Aspect)

Figure 4:
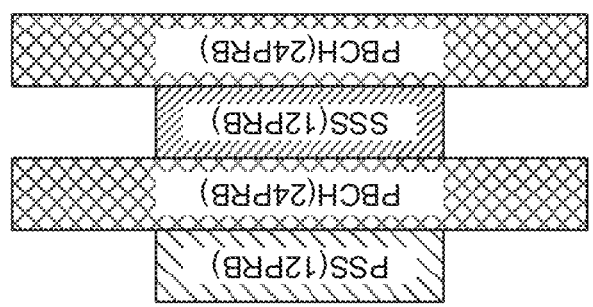
FIG. 4 is a diagram to show another example of an SS/PBCH block according to the present embodiment.
Figure 4:
Figure 4:
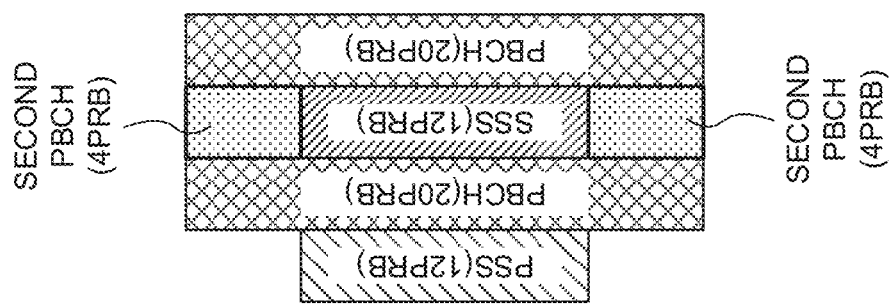

According to a second aspect of the invention, a second PBCH is arranged in at least part of a predetermined frequency domain that neighbors one of the primary synchronization signal (PSS) and the secondary synchronization signal (SSS) (see FIG. 4).

In FIG. 4, the PSS (twelve PRBs), the first PBCH (twenty PRBs), the SSS (twelve PRBs) and the first PBCH (twenty PRBs) are sequentially arranged in different time domains (time fields) (for example, symbols). Furthermore, a configuration is shown here in which the second PBCH (four PRBs) is placed in one of the time domain in which the PSS is arranged and the time domain in which the SSS is arranged. A case is shown here where the second PBCH is placed in the same time domain as the time domain in which the SSS is arranged and where the second PBCH is not placed in the time domain in which the PSS is arranged.

When the PSS uses 127 subcarriers out of twelve PRBs (144 subcarriers) and DL signals (for example, the second PBCH) are placed in PRBs to neighbor the PSS, guard subcarriers of eight subcarriers and nine subcarriers are configured between the ends of the PSS and the DL signals.

If the guard period between the PSS and a DL signal that is arranged in a predetermined frequency domain neighboring the PSS is short, characteristics in the detection of the PSS may deteriorate. Therefore, by using a configuration which provides no DL signals (for example, the second PBCH) in neighboring frequency domains of the PSS, it is possible to suppress the deterioration of characteristics in the detection of the PSS.

Note that a configuration may be adopted here in which the second PBCH is provided in domains neighboring the PSS and in which no second PBCH is provided in domains neighboring the SSS.

(Third Aspect)

Figure 5:
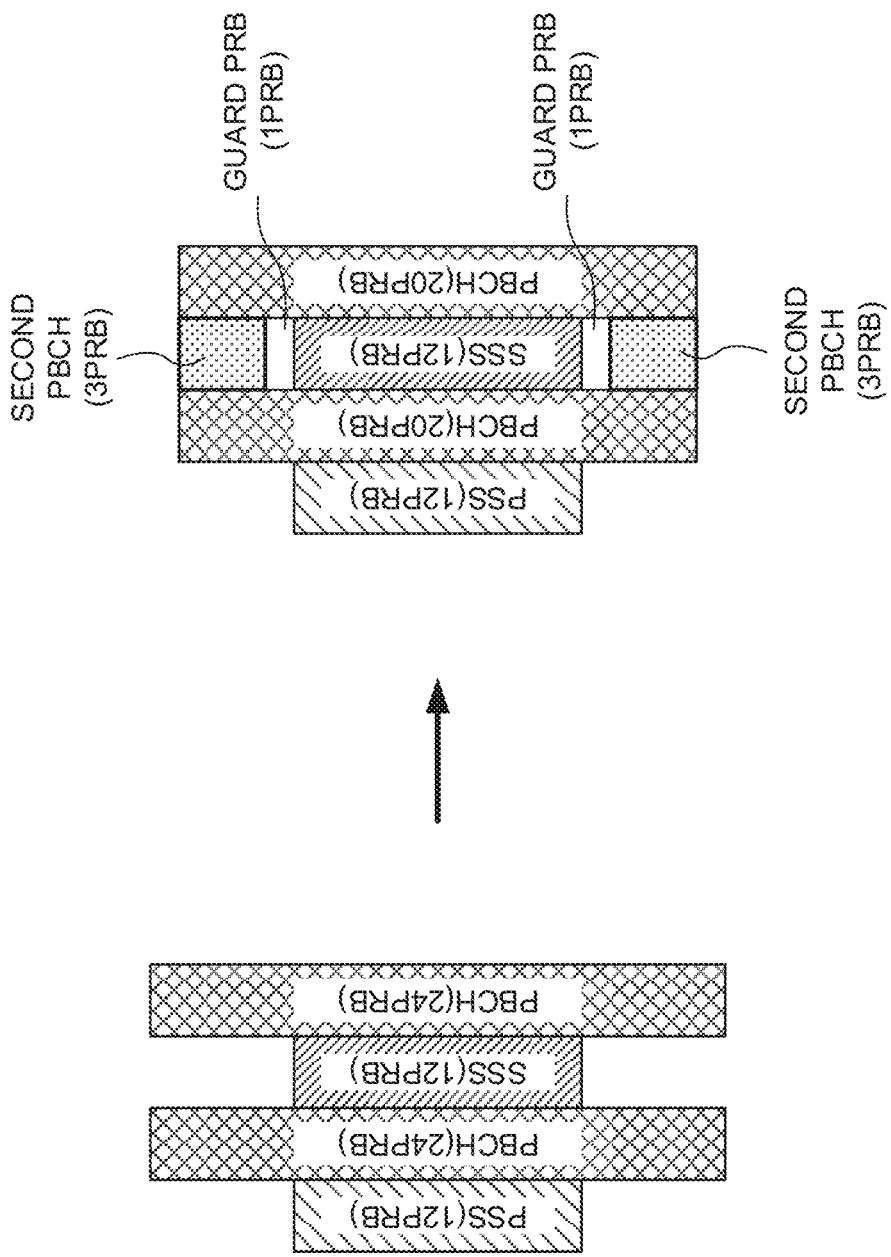
FIG. 5 is a diagram to show another example of an SS/PBCH block according to the present embodiment.

According to a third aspect of the present invention, the second PBCH is arranged in at least part of predetermined frequency domains that neighbor the primary synchronization signal (PSS) and/or the secondary synchronization signal (SSS), a guard period (guard PRBs) that is configured with a predetermined domain (for example, one or more PRBs) is provided between the synchronization signal and the second PBCH (see FIG. 5).

In FIG. 5, the PSS (twelve PRBs), the first PBCH (twenty PRBs), the SSS (twelve PRBs) and the first PBCH (twenty PRBs) are sequentially arranged in different time domains (for example, symbols). Furthermore, a configuration is shown here in which the second PBCH (for example, three PRBs) is placed in one of the time domain in which the PSS is arranged and the time domain in which the SSS is arranged. A case is shown here where the second PBCH is placed, via a guard period, in the same time domain as the time domain in which the SSS is arranged, and where the second PBCH is not arranged in the time domain in which the PSS is arranged.

In the event the SSS uses 127 subcarriers out of twelve PRBs (144 subcarriers) and DL signals (for example, the second PBCH) are placed in PRBs to neighbor the SSS, guard subcarriers of eight subcarriers and nine subcarriers are configured between the ends of the SSS and the DL signals.

If the guard period between the SSS and a DL signal that is arranged in a predetermined frequency domain neighboring this SSS is short, characteristics in the detection of the SSS may deteriorate. Therefore, by using a configuration which provides guard periods of a predetermined domain (for example, one PRB or more) when providing the second PBCH in frequency domains to neighbor the SSS, it is possible to suppress the deterioration of characteristics in the detection of the PSS.

Note that a configuration may be adopted here in which the second PBCH is provided in domains neighboring the PSS via guard periods and in which no second PBCH is provided in domains neighboring the SSS.

Figure 6:
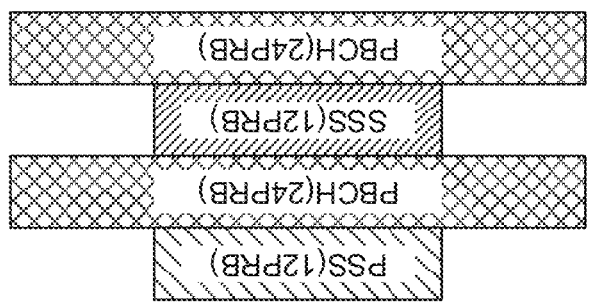
FIG. 6 is a diagram to show another example of an SS/PBCH block according to the present embodiment.
Figure 6:
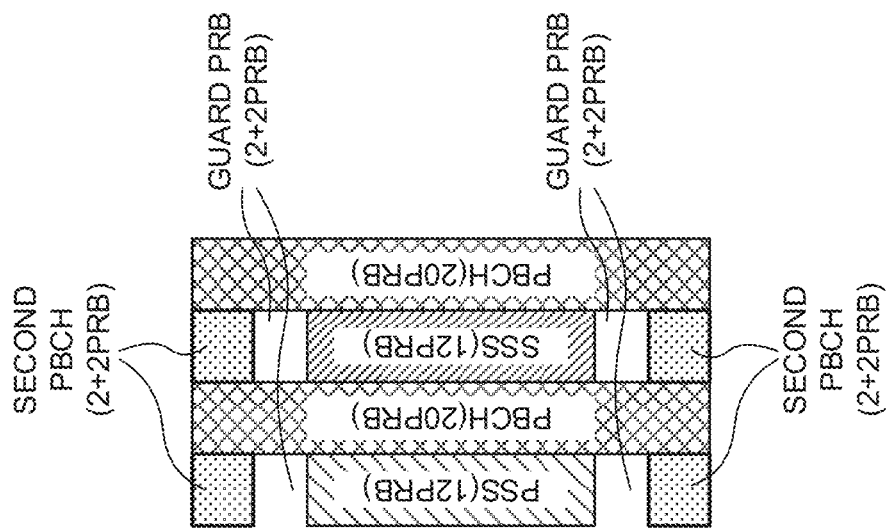

Alternatively, the second PBCH may be provided, via guard periods, in both of domains neighboring the PSS and the SSS (see FIG. 6). FIG. 6 shows a configuration in which the second PBCH (for example, two PRBs) is placed, via a guard period (for example, two PRBs), in each of the time domain in which the PSS is arranged and the time domain in which the SSS is arranged.

By arranging the second PBCH in domains that neighbor the PSS and the SSS in this manner, it is possible to secure the amount of resources for use for transmitting PBCHs. Also, it is possible to widen the guard periods (for example, to two PRBs), while securing the amount of resources for PBCHs, compared to when PBCHs are arranged only in domains that neighbor one of the PSS and the SSS. By this means, even when a second PBCH is provided, it is possible to suppress the deterioration of characteristics in the detection of the PSS and the SSS.

(Fourth Aspect)

Figure 7:
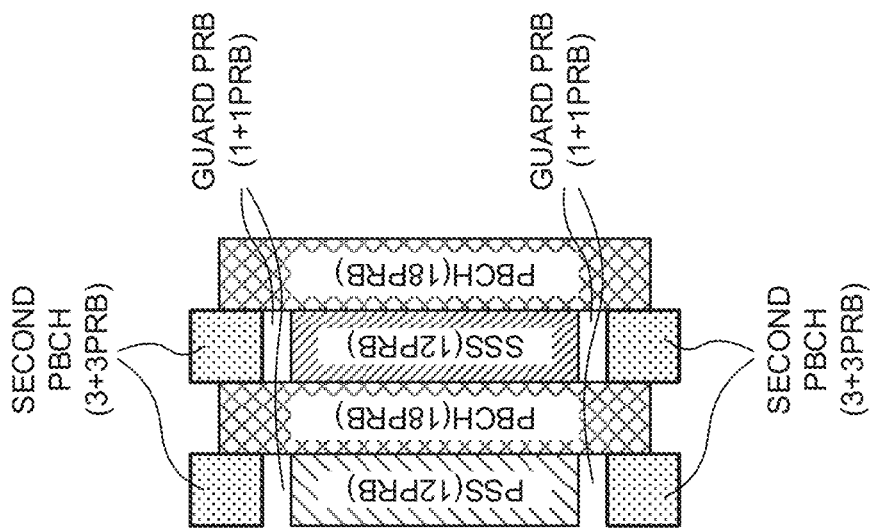
FIG. 7 is a diagram to show another example of an SS/PBCH block according to the present embodiment.
Figure 7:
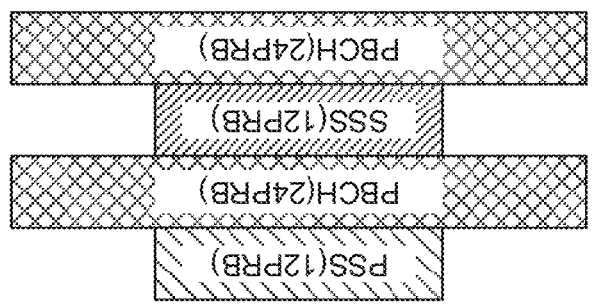

According to a fourth aspect of the present invention, a second PBCH is arranged in at least part of predetermined frequency domains that neighbor the primary synchronization signal (PSS) and/or the secondary synchronization signal (SSS), and this second PBCH is arranged outside the frequency domain (bandwidth) of the first PBCH (see FIG. 7). That is, the second PBCH is not only arranged in the range of the frequency domain of the first PBCH, but is also arranged outside the range of the frequency domain of the first PBCH.

In FIG. 7, the PSS (twelve PRBs), the first PBCH (eighteen PRBs), the SSS (twelve PRBs) and the first PBCH (eighteen PRBs) are sequentially arranged in different time domains (for example symbols). Furthermore, a configuration is shown here in which the second PBCH is, for example, three PRBs) is arranged, via a guard period (which is, for example, one PRB), in the time domain in which the PSS is arranged and in the time domain in which the SSS is arranged.

Also, a case is shown here where the second PBCH is arranged over (beyond) the edge parts of the first PBCH, and where the second PBCH is placed in domains that go one PRB beyond both edge parts of the first PBCH. Note that the extended part of the second PBCH (part that is outside the edge part of the first PRB) is not limited to being one PRB.

However, from the perspective of suppressing the increase in the number of SS rasters, it is preferable that the extended part of the second PBCH is not more than a predetermined number of PRBs (for example one or two PRBs). It is also possible to adopt a configuration which does not configure a guard period between the PSS and/or the SSS and the second PBCH.

In this way, by allowing the second PBCH to be placed outside the bandwidth (frequency domain) of the first PBCH, resources that can be used to transmit PBCHs can be increased. In particular, even when a guard period is provided between the PSS and/or the SSS and the second PBCH, it is still possible to secure resources for use for transmitting PBCHs.

Figure 8:
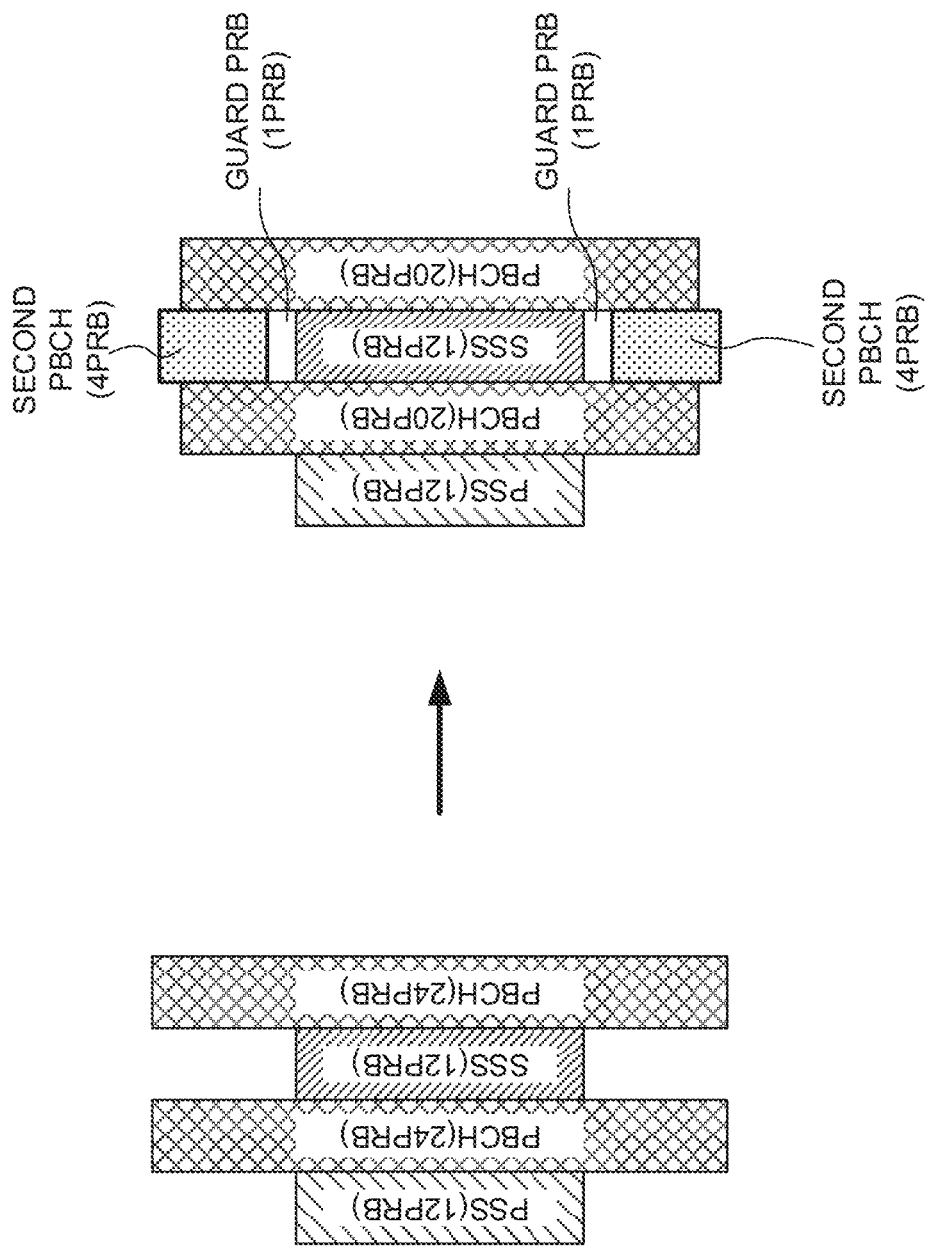
FIG. 8 is a diagram to show another example of an SS/PBCH block according to the present embodiment.

In addition, even when the second PBCH is configured in domains that neighbor one of the primary synchronization signal (PSS) and the secondary synchronization signal (SSS), the second PBCH may be arranged not only in the range of the frequency domain for the first PBCH, but may also be arranged outside the range of the frequency domain for the first PBCH (see FIG. 8).

In FIG. 8, the PSS (twelve PRBs), the first PBCH (twenty PRBs), the SSS (twelve PRBs), and the first PBCH twenty PRBs) are sequentially arranged in different time domains (for example, symbols). Furthermore, a case is shown here where the second PBCH (four PRBs) is placed, via a guard period (one PRB), in the same time domain as the time domain in which the SSS is arranged, and where the second PBCH is not arranged in the time domain in which the PSS is arranged.

Also, a case is shown here where the second PBCH is arranged over (beyond) the edge parts of the first PBCH, and where the second PBCH is placed in domains that go one PRB beyond both edge parts of the first PBCH. It is also possible to adopt a configuration which does not configure a guard period between the PSS and/or the SSS and the second PBCH.

In this way, by allowing the second PBCH to be placed outside the bandwidth (frequency domain) of the first PBCH, resources that can be used to transmit PBCHs can be increased. In particular, even when a guard period is provided between the SSS and the second PBCH, it is still possible to secure resources for use for transmitting PBCHs.

Note that, in FIG. 8, a configuration may be used here in which a second PBCH with an extended part is provided in domains neighboring the PSS and in which no second PBCH is provided in domains neighboring the SSS.

(Radio Communication System)

Now, the structure of a radio communication system according to one embodiment of the present invention will be described below. In this radio communication system, communication is performed using a combination of at least one of a plurality of aspects that have been described above.

Figure 9:
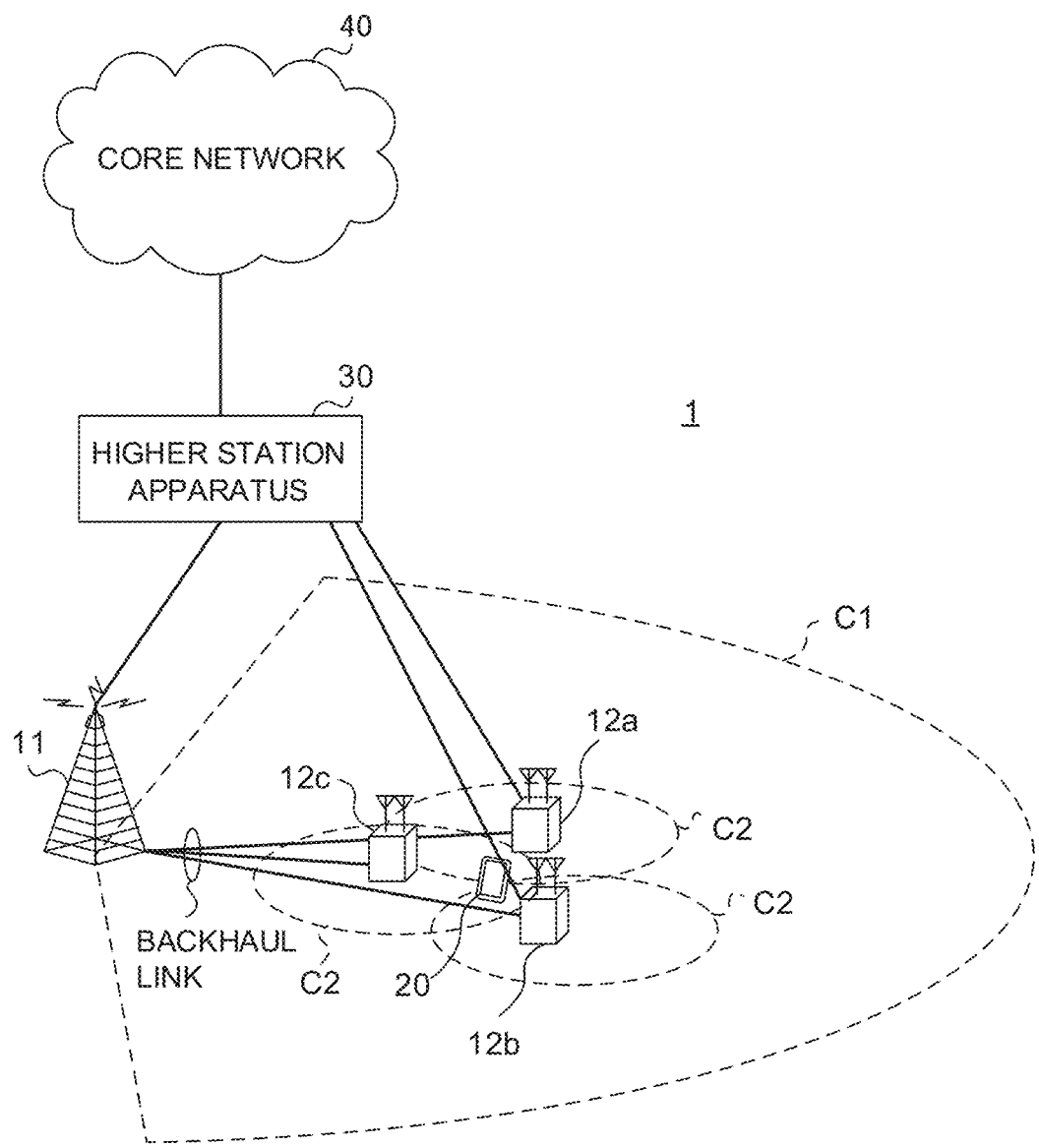
FIG. 9 is a diagram to show an example of a schematic structure of a radio communication system according to one embodiment of the present invention.

FIG. 9 is a diagram to show an example of a schematic structure of a radio communication system according to one embodiment. A radio communication system 1 can adopt carrier aggregation (CA) and/or dual connectivity (DC) to group a plurality of fundamental frequency blocks (component carriers) into one, where the LIE system bandwidth (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "FRA (Future Radio Access)," "New-RAT (Radio Access Technology)" and so on, or may be seen as a system to implement these.

The radio communication system 1 includes a radio base station 11 that forms a macro cell C1, and radio base stations 12a to 12c that are placed within the macro cell C1 and that form small cells C2, which are narrower than the macro cell C1. Also, user terminals 20 are placed in the macro cell C1 and in each small cell C2. The arrangements and the number of cells and user terminals 20 are not limited to those illustrated in the drawing.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a plurality of cells (CCs) (for example, five or fewer CCs or six or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

Furthermore, the user terminal 20 can communicate using time division duplexing (TDD) and/or frequency division duplexing (FDD) in each cell. Furthermore, in each cell (carrier), a single numerology may be employed, or a plurality of different numerologies may be employed.

A numerology may refer to a communication parameter that applies to transmission and/or receipt of a given signal and/or channel, and may represent at least one of the subcarrier spacing, the bandwidth, the symbol duration, the cyclic prefix duration, the subframe duration, the TTI duration, the number of symbols per TTI, the radio frame configuration, the filtering process, the windowing process and so on.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmission/reception point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmission/reception points" and so on.

Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) and/or OFDMA are applied to the uplink.

OFDMA is a multi-carrier communication scheme to perform communication by dividing a frequency bandwidth into a plurality of narrow frequency bandwidths (subcarriers) and mapping data to each subcarrier SC-FDMA is a single-carrier communication scheme to mitigate interference between terminals by dividing the system bandwidth into bands formed with one or continuous resource blocks per terminal, and allowing a plurality of terminals to use mutually different bands. Note that, uplink and downlink radio access schemes are not limited to these combinations, and other radio access schemes may be used.

In the radio communication system 1, a downlink shared channel (PDSCH (Physical Downlink Shared CHannel)), which is used by each user terminal 20 on a shared basis, a broadcast channel (PBCH (Physical Broadcast CHannel)), downlink L1/L2 control channels and so on are used as downlink channels. User data, higher layer control information, SIBs (System Information Blocks) and so on are communicated in the PDSCH. Also, the MIB (Master Information Block) is communicated in the PBCH.

The downlink L1/L2 control channels include at least one of a downlink control channel (PDCCH (Physical Downlink Control CHannel)) and/or an EPDCCH (Enhanced Physical Downlink Control CHannel), a PCFICH (Physical Control Format Indicator CHannel), and a PHICH (Physical Hybrid-ARQ Indicator CHannel). The PDCCH communicates, for example, downlink control information (DCI) that includes PDSCH and/or PUSCH scheduling information, and so on.

Note that scheduling information may be reported in DCI. For example, DCI to schedule receipt of DL data may be referred to as a "DL assignment," and DCI to schedule UL data transmission may also be referred to as a "UL grant."

The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACKs," "ACK/NACKs," etc.) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH (Physical Uplink Shared CHannel)), which is used by each user terminal 20 on a shared basis, an uplink control channel (PUCCH (Physical Uplink Control CHannel)), a random access channel (PRACH (Physical Random Access CHannel)) and so on are used as uplink channels. User data, higher layer control information and so on are communicated by the PUSCH. Also, in the PUCCH, downlink radio quality information (CQI (Channel Quality Indicator)), delivery acknowledgment information, scheduling requests (SRs) and so on are communicated. By means of the PRACH, random access preambles for establishing connections with cells are communicated.

In the radio communication system 1, cell-specific reference signals (CRSS), channel state information reference signals (CSI-RSs), demodulation reference signals (DMRSs), positioning reference signals (PRSs) and so on are communicated as downlink reference signals. Also, in the radio communication system 1, measurement reference signals (SRSs (Sounding Reference Signals)), demodulation reference signals (DMRSs) and so on are communicated as uplink reference signals. Note that the DMRSs may be referred to as "user terminal-specific reference signals (UE-specific reference signals)." Also, the reference signals to be communicated are by no means limited to these.

In the radio communication system 1, synchronization signals (for example, PSS (Primary Synchronization Signal)/SSS (Secondary Synchronization Signal)), a broadcast channel (PBCH (Physical Broadcast CHannel)) and others are communicated. Note that the synchronization signals and the PBCH may be transmitted in synchronization signal blocks (SSBs).

(Radio Base Station)

Figure 10:
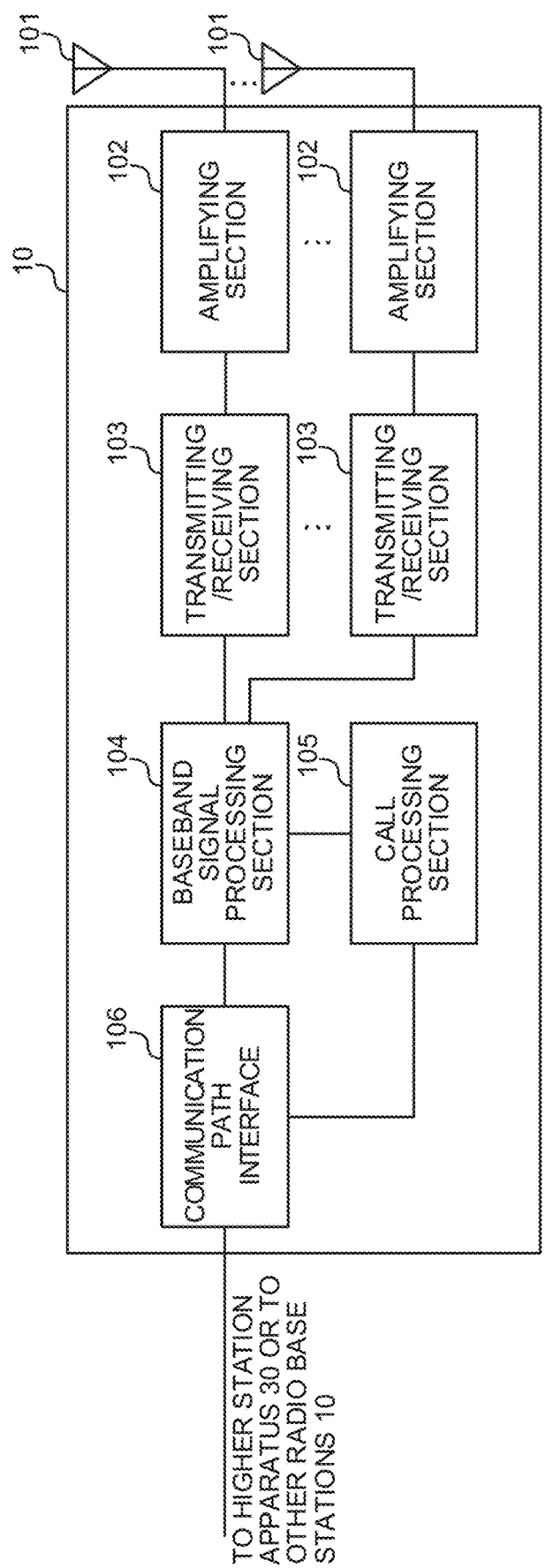
FIG. 10 is a diagram to show an example of an overall structure of a radio base station according to one embodiment.

FIG. 10 is a diagram to show an example of an overall structure of a radio base station according to one embodiment. A radio base station 10 has a plurality of transmitting/receiving antennas 101, amplifying sections 102, transmitting/receiving sections 103, a baseband signal processing section 104, a call processing section 105, and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a preceding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present disclosure pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (ITT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

Note that the transmitting/receiving sections 103 may furthermore have an analog beam forming section that forms analog beams. The analog beamforming section may be constituted by an analog beamforming circuit (for example, a phase shifter, a phase shifting circuit, etc.) or analog beamforming apparatus (for example, a phase shifting device) that can be described based on general understanding of the technical field to which the present invention pertains. Furthermore, the transmitting/receiving, antennas 101 may be constituted by, for example, array antennas. In addition, the transmitting/receiving sections 103 are structured so that single-BF or multiple-BF operations can be used.

The transmitting/receiving sections 103 transmit SS/PBCH blocks, which contain synchronization signals (PSS and/or SSS) and broadcast channels (PBCHs). For example, the transmitting/receiving sections 103 transmit SS/PBCH blocks, containing a synchronization signal, which is located in a first frequency domain, a first broadcast channel, which is arranged in a second frequency domain that is wider than the first frequency domain, and a second broadcast channel, which is arranged in at least part of predetermined frequency domains that neighbor the first frequency domain.

Figure 11:
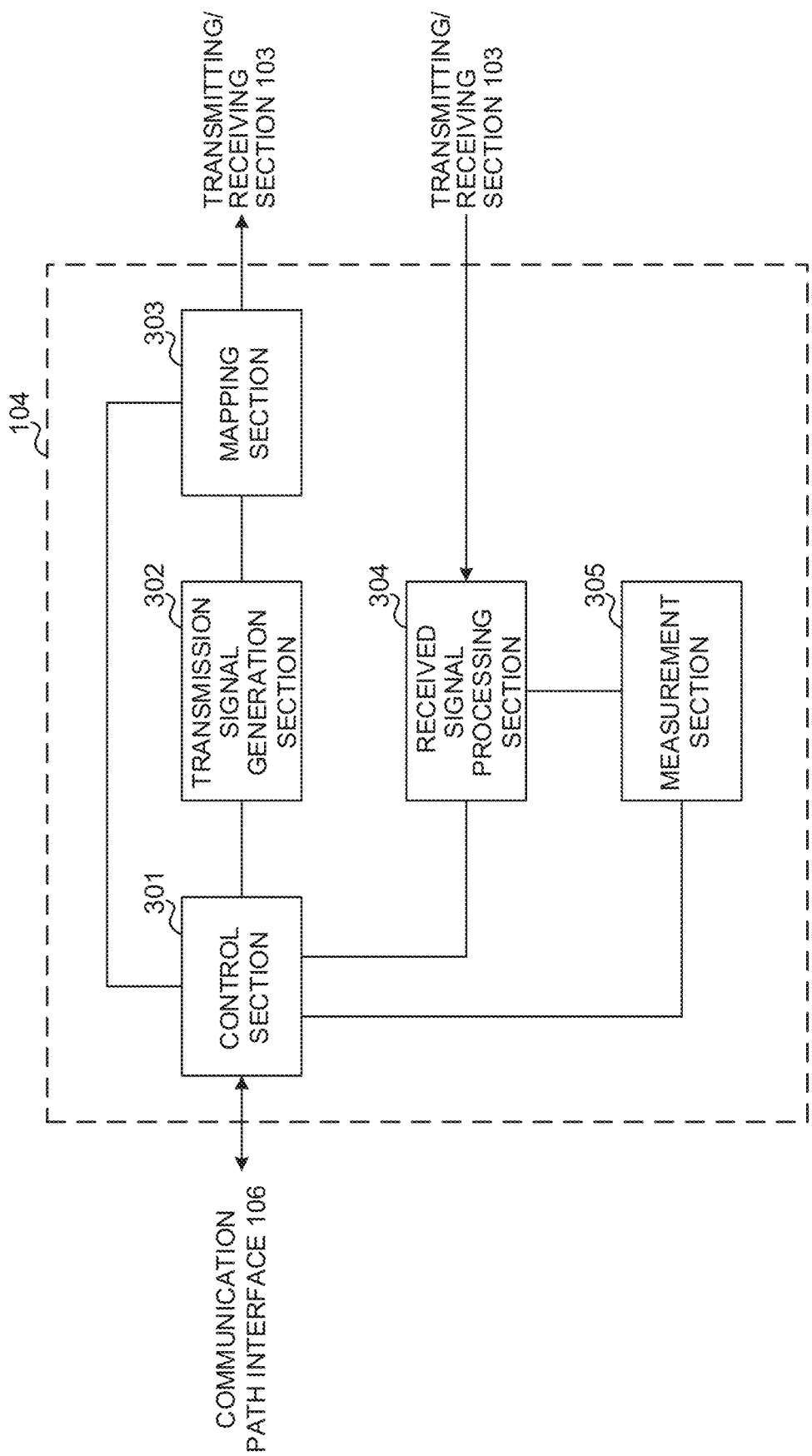
FIG. 11 is a diagram to show an example of a functional structure of a radio base station according to one embodiment.

FIG. 11 is a diagram to show an example of a functional structure of a radio base station according to one embodiment. Note that, although this example primarily shows functional blocks that pertain to characteristic parts of the present embodiment, the radio base station 10 has other functional blocks that are necessary for radio communication as well.

The baseband signal processing section 104 has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present disclosure pertains.

The control section 301 controls, for example, the generation of signals in the transmission signal generation section 302, the allocation of signals by the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of system information, downlink data signals (for example, signals transmitted in the PDSCH) and downlink control signals (for example, signals transmitted in the PDCCH and/or the EPDCCH, such as delivery acknowledgement information). Also, the control section 301 controls the generation of downlink control signals, downlink data signals and so on, based on the results of deciding whether or not retransmission control is necessary for uplink data signals, and so on.

The control section 301 controls the scheduling of synchronization signals (for example, PSS/SSS), broadcast channels (PBCHs), downlink reference signals (for example, CRS, CSI-RS, DMRS, etc.), and so on.

The control section 301 controls the transmission of SS/PBCH blocks that contain a synchronization signal, which is located in a first frequency domain, a first broadcast channel, which is arranged in a second frequency domain that is wider than the first frequency domain, and a second broadcast channel, which is located in at least a part of predetermined frequency domains that neighbor the first frequency domain.

The synchronization signals and the second broadcast channel may be arranged in the same time domain, and the synchronization signals and the first broadcast channel may be arranged in different time domains. The second frequency domain (for example, the number of PRBs) may be less than twice the first frequency domain (for example, the number of PRBs). A guard period of one PRB or more may be configured between the synchronization signals and the second broadcast channel.

The synchronization signals include a primary synchronization signal (PSS) and a secondary synchronization signal (SSS), which are arranged in different time domains, and the second broadcast channel may be arranged in the same time domain as that of the primary synchronization signal and in the same time domain as that of the secondary synchronization signal. Alternatively, the second broadcast channel may be arranged in only one of the same time domain as that of the primary synchronization signal and the same time domain as that of the secondary synchronization signal.

A configuration may be used here in which the second broadcast channel is configured within the second frequency domain or configured beyond the range of the second frequency domain.

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present disclosure pertains.

For example, the transmission signal generation section 302 generates DL assignments, which report downlink signal allocation information, and UL grants, which report uplink signal allocation information, based on commands from the control section 301. DL assignments and UL grants are both DCI, and follow the DCI format. Also, the downlink data signals are subjected to the coding process, the modulation process and so on, by using coding rates and modulation schemes that are determined based on, for example, channel state information (CSI) from each user terminal 20.

The mapping section 303 maps the downlink signals generated in the transmission signal generation section 302 to predetermined radio resources based on commands from the control section 301, and outputs these to the transmitting/receiving sections 103. The mapping section 303 can be constituted by a mapper, a mapping circuit or mapping apparatus that can be described based on general understanding of the technical field to which the present disclosure pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminals 20 (uplink control signals, uplink data signals, uplink reference signals and so on). For the received signal processing section 304, a signal processor, a signal processing circuit or signal processing apparatus that can be described based on general understanding of the technical field to which the present disclosure pertains can be used.

The received signal processing section 304 outputs the decoded information acquired through the receiving processes, to the control section 301. For example, when a PUCCH to contain an HARQ-ACK is received, the received signal processing section 304 outputs this HARQ-ACK to the control section 301. Also, the received signal processing section 304 outputs the received signals and/or the signals after the receiving processes to the measurement section 305.

The measurement section 305 conducts measurements with respect to the received signals. The measurement section 305 can be constituted by a measurer, a measurement circuit or measurement apparatus that can be described based on general understanding of the technical field to which the present disclosure pertains.

For example, the measurement section 305 may perform RRM (Radio Resource Management) measurements, CSI (Channel State information) measurements and so on, based on the received signals. The measurement section 305 may measure the received power (for example, RSRP (Reference Signal Received Power)), the received quality (for example, RSRQ (Reference Signal Received Quality), SINR (Signal to Interference plus Noise Ratio), etc.), SNR (Signal to Noise Ratio)), the signal strength (for example, RSSI (Received Signal Strength Indicator)), transmission path information (for example, CSI), and so on. The measurement results may be output to the control section 301.

(User Terminal)

Figure 12:
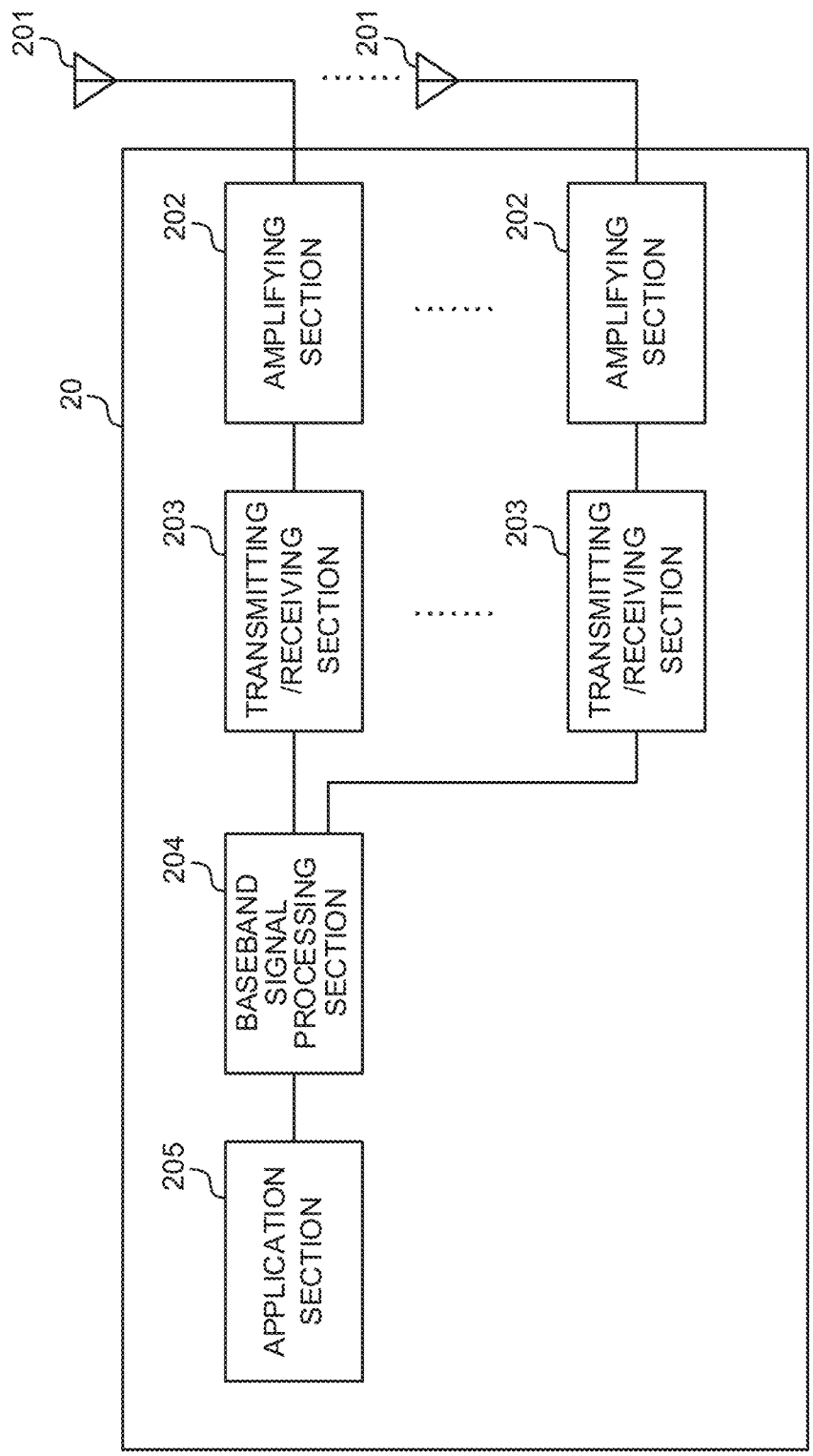
FIG. 12 is a diagram to show an example of an overall structure of a user terminal according to one embodiment.

FIG. 12 is a diagram to show an example of an overall structure of a user terminal according to one embodiment. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present disclosure pertains. Note that a transmitting/receiving section 203 may be structured as a transmitting/receiving section in one entity, or may be constituted by a transmitting section and a receiving section.

The baseband signal processing section 204 performs receiving processes for the baseband signal that is input, including an FFT process, error correction decoding, a retransmission control receiving process and so on. Downlink user data is forwarded to the application section 205. The application section 205 performs processes related to higher layers above the physical layer and the MAC layer, and so on. In the downlink data, the broadcast information can be also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving sections 203.

Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Note that the transmitting/receiving sections 203 may furthermore have an analog beam forming section that forms analog beams. The analog beamforming section may be constituted by an analog beamforming circuit (for example, a phase shifter, a phase shifting circuit, etc.) or analog beamforming apparatus (for example, a phase shifting device) that can be described based on general understanding of the technical field to which the present invention pertains. Furthermore, the transmitting/receiving antennas 201 may be constituted by, for example, array antennas. In addition, the transmitting/receiving sections 203 are structured so as to be capable of single-BF and multiple-BF operations.

The transmitting/receiving sections 203 receive SS/PBCH blocks that contain synchronization signals (PSS and/or SSS) and broadcast channels (PBCHs). For example, the transmitting/receiving section 203 receives SS/PBCH blocks, containing a synchronization signal, which is located in the first frequency domain, a first broadcast channel, which is arranged in a second frequency domain that is wider than the first frequency domain, and a second broadcast channel, which is arranged in at least part of predetermined frequency domains that neighbor the first frequency domain.

Figure 13:
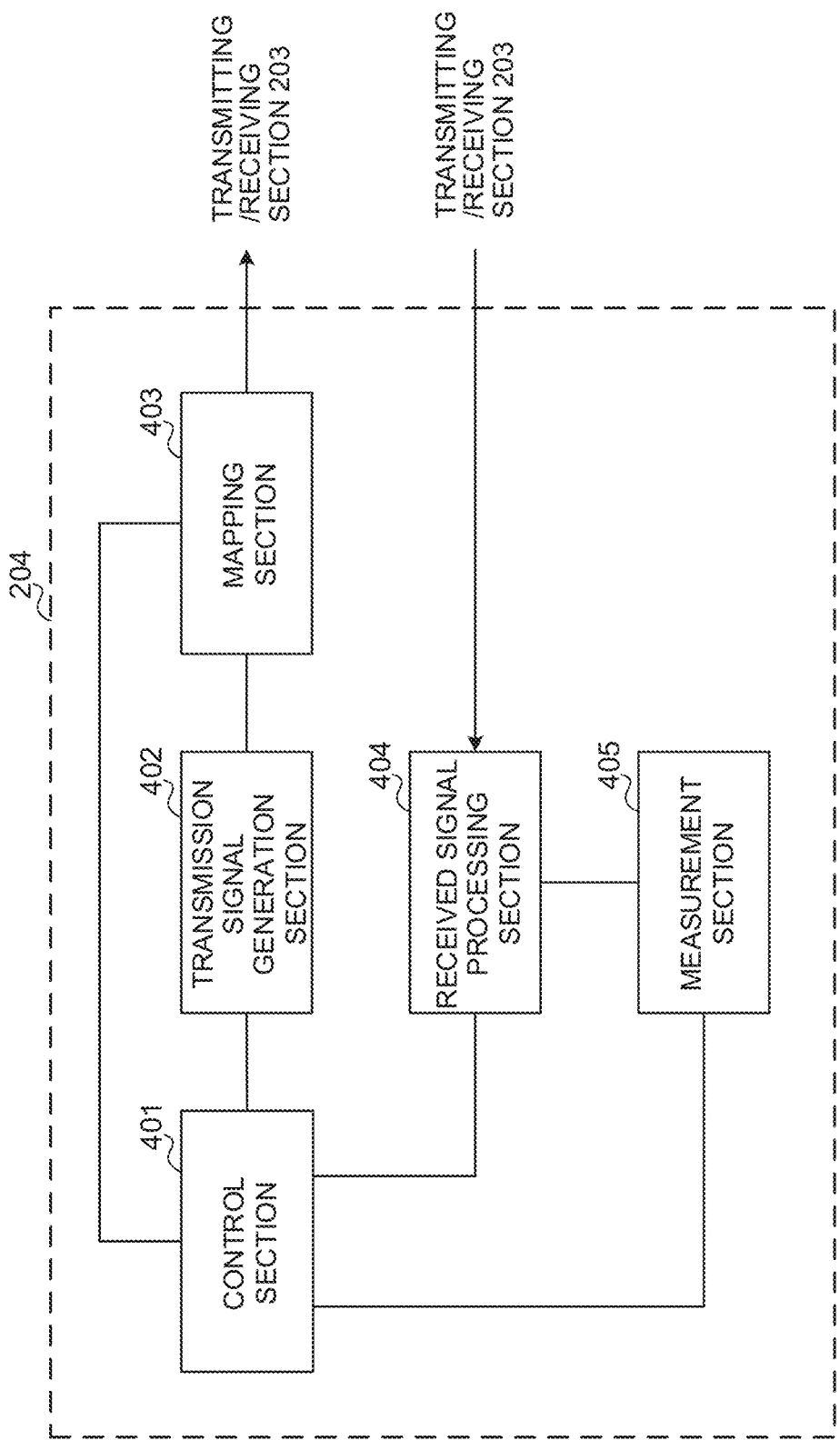
FIG. 13 is a diagram to show an example of a functional structure of a user terminal according to one embodiment.

FIG. 13 is a diagram to show an example of a functional structure of a user terminal according to one embodiment. Note that, although this example primarily shows functional blocks that pertain to characteristic parts of the present embodiment, the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations have only to be included in the user terminal 20, and some or all of these configurations may not be included in the baseband signal processing section 204.

The control section 401 controls the whole of the user terminal 20. For the control section 401, a controller, a control circuit or control apparatus that can be described based on general understanding of the technical field to which the present disclosure pertains can be used.

The control section 401, for example, controls the generation of signals in the transmission signal generation section 402, the allocation of signals by the mapping section 403, and so on. Furthermore, the control section 401 controls the signal receiving processes in the received signal processing section 404, the measurements of signals in the measurement section 405, and so on.

The control section 401 acquires the downlink control signals and downlink data signals transmitted from the radio base station 10, via the received signal processing section 404. The control section 401 controls the generation of uplink control signals and/or uplink data signals based on the results of deciding whether or not retransmission control is necessary for the downlink control signals and/or downlink data signals, and so on.

The control section 401 controls the receipt of SS/PBCH blocks containing a synchronization signal, which is located in the first frequency domain, a first broadcast channel, which is arranged in a second frequency domain that is wider than the first frequency domain, and a second broadcast channel, which is arranged in at least part of predetermined frequency domains that neighbor the first frequency domain.

The synchronization signals and the second broadcast channel may be arranged in the same time domain, and the synchronization signals and the first broadcast channel may be arranged in different time domains. The second frequency domain (for example, the number of PRBs) may be less than twice the first frequency domain (for example, the number of PRBs). A guard period of one PRB or more may be configured between the synchronization signals and the second broadcast channel.

The synchronization signals include a primary synchronization signal (PSS) and a secondary synchronization signal (SSS), which are arranged in different time domains, and the second broadcast channel may be arranged in the same time domain as that of the primary synchronization signal and in the same time domain as that of the secondary synchronization signal. Alternatively, the second broadcast channel may be arranged in only one of the same time domain as that of the primary synchronization signal and the same time domain as that of the secondary synchronization signal.

The configuration may be used here in which the second broadcast channel is configured within the second frequency domain or configured beyond the range of the second frequency domain.

The transmission signal generation section 402 generates uplink signals (uplink control signals, uplink data signals, uplink reference signals and so on) based on commands from the control section 401, and outputs these signals to the mapping section 403. The transmission signal generation section 402 can be constituted by a signal generator, a signal generating circuit or signal generating apparatus that can be described based on general understanding of the technical field to which the present disclosure pertains.

For example, the transmission signal generation section 402 generates uplink control signals related to delivery acknowledgement information, channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and outputs the result to the transmitting/receiving sections 203. The mapping section 403 can be constituted by a mapper, a mapping circuit or mapping apparatus that can be described based on general understanding of the technical field to which the present disclosure pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present disclosure pertains. Also, the received signal processing section 404 can constitute the receiving section according to the present disclosure.

The received signal processing section 404 outputs the decoded information, acquired through the receiving processes, to the control section 401. The received signal processing section 404 outputs, for example, broadcast information, system information, RRC signaling, DCI and so on, to the control section 401. Also, the received signal processing section 404 outputs the received signals and/or the signals after the receiving processes to the measurement section 405.

The measurement section 405 conducts measurements with respect to the received signals. The measurement section 405 can be constituted by a measurer, a measurement circuit or measurement apparatus that can be described based on general understanding of the technical field to which the present disclosure pertains.

For example, the measurement section 405 may perform RRM measurements, CSI measurements, and so on, based on the received signals. The measurement section 405 may measure the received power (for example, RSRP), the received quality (for example, RSRQ, SINR, SNR, etc.), the signal strength (for example, RSSI), transmission path information (for example, CSI), and so on. The measurement results may be output to the control section 401.

(Hardware Structure)

Note that the block diagrams that have been used to describe the above embodiments show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically aggregated, or may be realized by directly and/or indirectly connecting two or more physically and/or logically separate pieces of apparatus wire or wireless, for example) and using these multiple pieces of apparatus.

Figure 14:
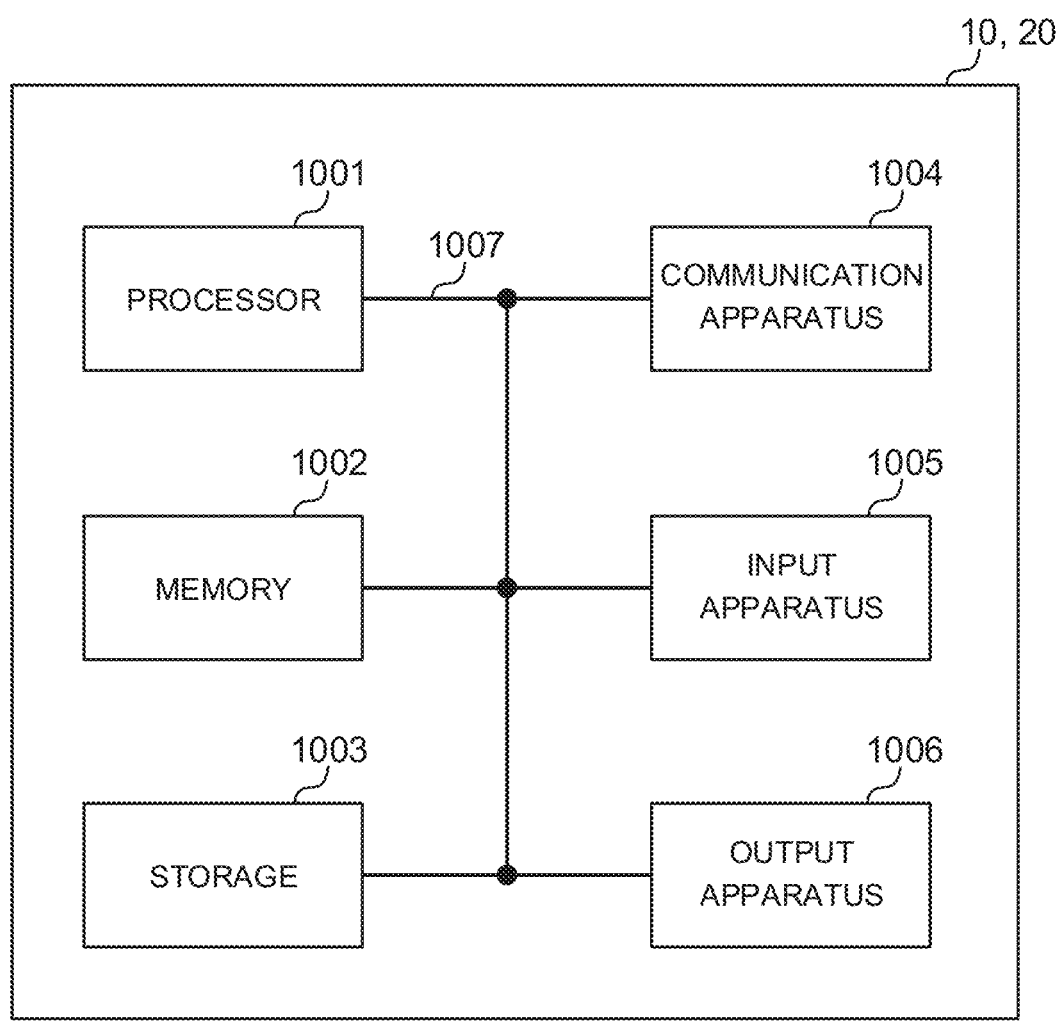
FIG. 14 is a diagram to show an example of a hardware structure of a radio base station and a user terminal according to one embodiment.

That is, a radio base station, a user terminal and so on according to one embodiment of the present invention may function as a computer that executes the process according to each aspect of one embodiment. FIG. 14 is a diagram to show an example of a hardware structure of a radio base station and a user terminal according to one embodiment. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented in sequence, or in different manners, on one or more processors. Note that the processor 1001 may be implemented with one or more chips.

Each function of the radio base station 10 and the user terminal 20 is implemented by reading predetermined software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory (primary storage apparatus)" and so on. The memory 1002 can store executable programs (program codes), software modules and/or the like for implementing the radio communication methods according to one embodiment.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals" (or "signaling"). Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or multiple slots in the time domain. A subframe may be a fixed time duration (for example, 1 ms) not dependent on the numerology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on numerology. Also, a slot include a plurality of minislots. Each minislot may be comprised of one or more symbols in the time domain. Also, a minislot may be referred to as a "subslot."

A radio frame, a subframe, a slot, a minislot and a symbol all represent the time unit in signal communication. A radio frame, a subframe, a slot, a minislot and a symbol may be each called by other applicable names. For example, one subframe may be referred to as a "transmission time interval (TTI)," or a plurality of consecutive subframes may be referred to as a "TTI," or one slot or mini-slot may be referred to as a "TTI." That is, a subframe and/or a TTI may be a subframe (1 ms) in existing LTE, may be a shorter period than 1 ms (for example, one to thirteen symbols), or may be a longer period of time than 1 ms. Note that the unit to represent the TTI may be referred to as a "slot," a "mini slot" and so on, instead of a "subframe."

Here, a refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this.

The TTI may be the transmission time unit of channel-encoded data packets (transport blocks), code blocks and/or codewords, or may be the unit of processing in scheduling, link adaptation and so on. Note that, when a TTI is given, the period of time (for example, the number of symbols) in which transport blocks, code blocks and/or codewords are actually mapped may be shorter than the TTI.

Note that, when one slot or one minislot is referred to as a "TTI," one or more TTIs (that is, one or multiple slots or one or more minislots) may be the minimum time unit of scheduling. Also, the number of slots (the number of minislots) to constitute this minimum time unit of scheduling may be controlled.

A TTI having a time duration of 1 ms may be referred to as a "normal TTI (ITT in LTE Rel. 8 to 12)," a "long TTI," a "normal subframe," a "long subframe," and so on. A TTI that is shorter than a normal TTI may be referred to as a "shortened TTI," a "short TTI," "a partial TTI (or a "fractional TTI"), a "shortened subframe," a "short subframe," a "mini-slot," "a sub-slot" and so on.

Note that a long TTI (for example, a normal TTI, a subframe, etc.) may be replaced with a TTI having a time duration exceeding 1 ms, and a short TTI (for example, a shortened TTI) may be replaced with a TTI having a TTI duration less than the TTI duration of a long TTI and not less than 1 ms.

A resource block (RB) is the unit of resource allocation in the time domain and the frequency domain, and may include one or a plurality of consecutive subcarriers in the frequency domain. Also, an RB may include one or more symbols in the time domain, and may be one slot, one minislot, one subframe or one TTI in length. One TTI and one subframe each may be comprised of one or more resource blocks. Note that one or more RBs may be referred to as a "physical resource block (PRB (Physical RB))," a "subcarrier group (SCG)," a "resource element group (REG)," an "PRB pair," an "RB pair" and so on.

Furthermore, a resource block may be comprised of one or more resource elements (REs). For example, one RE may be a radio resource domain of one subcarrier and one symbol.

Note that the structures of radio frames, subframes, slots, minislots, symbols and so on described above are merely examples. For example, configurations pertaining to the number of subframes included in a radio frame, the number of slots included in a subframe, the number of mini-slots included in a slot, the number of symbols and RBs included in a slot or a mini-slot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to predetermined values, or may be represented using other applicable information. For example, a radio resource may be specified by a predetermined index.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and output via a plurality of network nodes.

The information, signals and so on that are input and/or output may be stored in a specific location (for example, in a memory), or may be managed in a control table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)"

and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (for example, by not reporting this piece of information, by reporting another piece of information, and so on).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, misted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present disclosure may be applied to a configuration in which communication between a radio base station and a user terminal is replaced with communication among a plurality of user terminals (D2D (Device-to-Device)). In this case, user terminals 20 may have the functions of the radio base stations 10 described above. In addition, terms such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by upper nodes. In a network comprised of one or more network nodes with base stations, it is clear that various operations that are performed so as to communicate with terminals can be performed by base stations, one or more network nodes (for example, MMEs (Mobility Management Entities), S-GWs (Serving-Gateways) and so on may be possible, but these are not limiting) other than base stations, or combinations of these.

The aspects/embodiments illustrated in this specification may be used individually or in combinations, which may be switched depending on the mode of implementation, Also, the order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark) and other adequate radio communication methods, and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used herein only for convenience, as a method for distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination of these. For example, "connection" may be interpreted as "access.

As used herein, when two elements are connected, these elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency, microwave and optical (both visible and invisible) regions.

In the present specification, the phrase "A and B are different" may mean "A and B are different from each other." The terms such as "leave" "coupled" and the like may be interpreted as well.

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

(Additional Notes)

Now, supplementary notes on the present disclosure will be added below.

The present disclosure relates to the design of NR-PBCH and SS blocks (SS/PBCH blocks).

In RAN 1, research is underway to arrange the SS bandwidth=twelve PRBs, the PBCH bandwidth=twenty four PRBs, and the SS/PBCH block design in time division multiplexing (TDM) of PSS-PBCH-SSS-PBCH. Meanwhile, there is a demand to reduce the number of SS rasters, which is determined based on the minimum system bandwidth and the SS/PBCH block bandwidth, in order to reduce the load and the latency when a UE gains initial access.

Here, an SS raster refers to a location in frequency where synchronization signals are searched for when gaining initial access, and for example, FIG. 2 shows the SS rasters in the event of band n77 (3.3 to 4.2 GHz, and the minimum system bandwidth=10 MHz).

While a study is in progress to reduce the PBCH bandwidth from twenty-four PRBs to twelve or eighteen PRBs in order to reduce the number of SS rasters, in this case, there is a possibility that the reduction of resources that can be used to transmit PBCHs will lead to a deterioration of characteristics.

Therefore, according to the present application, resources that are located outside the synchronization signals (PSS and/or SSS) are used in part of PBCH transmission. This makes it possible to reduce the number of SS rasters by reducing the SS/PBCH block bandwidth, while maintaining the amount of resources that can be used to transmit PBCHs as much as possible.

Now, example of configurations relating to the present disclosure will be added below. Note that the present invention is not limited to the following configurations.

[Configuration 1]

A user terminal having:

a receiving section that receives a synchronization signal, which is arranged in a first frequency domain, a first broadcast channel, which is arranged in a second frequency domain that is wider than the first frequency domain, and a second broadcast channel, which is arranged in at least part of predetermined frequency domains that neighbor the first frequency domain; and a control section that controls receipt of the synchronization signals, the first broadcast channel and the second broadcast channel.

[Configuration 2]

The user terminal according to configuration 1, in which the synchronization signal and the second broadcast channel are arranged in the same time domain, and the synchronization signal and the first broadcast channel are arranged in different time domains.

[Configuration 3]

The user terminal according to configuration 1 or configuration 2, in which the second frequency domain is less than twice the first frequency domain.

[Configuration 4]

The user terminal according to one of configuration 1 to configuration 3, in which a guard period of one PRB or more is configured between the synchronization signal and the second broadcast channel.

[Configuration 5]

The user terminal according to one of configuration 1 to configuration 4, in which:

the synchronization signal comprises a primary synchronization signal (PSS) and a secondary synchronization signal (SSS), which are arranged in different time domains; and the second broadcast channel is arranged in the same time domain as that of the primary synchronization signal and in the same time domain as that of the secondary synchronization signal.

[Configuration 6]

The user terminal according to one of configuration 1 to configuration 4, in which:

the synchronization signal comprises a primary synchronization signal (PSS) and a secondary synchronization signal (SSS), which are arranged in different time domains; and the second broadcast channel is arranged in the same time domain as that of the secondary synchronization signal, and not arranged in the same time domain as that of the primary synchronization signal.

[Configuration 7]

The user terminal according to one of configuration 1 to configuration 6, in which the second broadcast channel is configured within the range of the second frequency domain or configured beyond the range of the second frequency domain.

[Configuration 8]

A base station having:
a transmission section that transmits a synchronization signal, which is arranged in a first frequency domain, a first broadcast channel, which is arranged in a second frequency domain that is wider than the first frequency domain, and a second broadcast channel, which is arranged in at least part of predetermined frequency domains that neighbor the first frequency domain; and
a control section that controls transmission of the synchronization signals, the first broadcast channel and the second broadcast channel.

[Configuration 9]

A radio communication method for a user terminal, including the steps of:
receiving a synchronization signal, which is arranged in a first frequency domain, a first broadcast channel, which is arranged in a second frequency domain that is wider than the first frequency domain, and a second broadcast channel, which is arranged in at least part of predetermined frequency domains that neighbor the first frequency domain; and
controlling receipt of the synchronization signals, the first broadcast channel and the second broadcast channel.

The invention claimed is:

1. A terminal comprising:
a processor that controls reception of a first synchronization signal (PSS), a second synchronization signal (SSS), and a broadcast channel (PBCH) in a given block that is formed by a given number of symbols and a given number of subcarriers; and
a receiver that receives the PSS, the SSS and the PBCH that form the given block,
wherein the PSS and the SSS are located in a first frequency domain,
wherein the PBCH is located in at least part of a second frequency domain that is broader than the first frequency domain,
wherein the PBCH is located in at least part of a first given domain neighboring the SSS in the frequency direction in the given block and the PBCH is not located in a second given domain neighboring the PSS in the frequency direction in the given block,
wherein a first part of the PBCH is located in the second frequency domain in a symbol other than that for the PSS and the SSS and a second part of the PBCH is located in at least part of the first given domain in a symbol that is the same as that for the SSS, and
wherein the PBCH is not located in a symbol that is the same as that for the PSS.

2. The terminal according to claim 1, wherein the second part of the PBCH is spaced from the SSS by an integer number of given subcarriers.

3. The terminal according to claim 2, wherein the second part of the PBCH is located in a third given domain spaced from the SSS by a first number of subcarriers, and in a fourth given domain spaced from the SSS by a second number of subcarriers.

4. The terminal according to claim 2, wherein the integer number of given subcarriers is larger than a single subcarrier.

5. The terminal according to claim 1, wherein the first frequency domain is included in the second frequency domain, and the first given domain is a domain in which the first frequency domain and the second frequency domain do not overlap.

6. The terminal according to claim 1, wherein the second frequency domain is less than double a size of the first frequency domain.

7. The terminal according to claim 1, wherein in the given block, a downlink signal is not located in a given resource that is contiguous with a resource of the PSS in the frequency direction.

8. The terminal according to claim 7, wherein the first frequency domain is included in a range of the second frequency domain, and a frequency domain of the given resource is an entire domain of the second frequency domain except for the first frequency domain.

9. A base station comprising:
a processor that controls transmission of a first synchronization signal (PSS), a second synchronization signal (SSS), and a broadcast channel (PBCH) in a given block that is formed by a given number of symbols and a given number of subcarriers; and
a transmitter that transmits the PSS, the SSS, and the PBCH that form the given block,
wherein the PSS and the SSS are located in a first frequency domain,
wherein the PBCH is located in at least part of a second frequency domain that is broader than the first frequency domain,
wherein the PBCH is located in at least part of a first given domain neighboring the SSS in the frequency direction in the given block and the PBCH is not located in a second given domain neighboring the PSS in the frequency direction in the given block,
wherein a first part of the PBCH is located in the second frequency domain in a symbol other than that for the PSS and the SSS and a second part of the PBCH is located in at least part of the first given domain in a symbol that is the same as that for the SSS, and
wherein the PBCH is not located in a symbol that is the same as that for the PSS.

10. A radio communication method for a terminal comprising:
controlling reception of a first synchronization signal (PSS), a second synchronization signal (SSS), and a broadcast channel (PBCH) in a given block that is formed by a given number of symbols and a given number of subcarriers; and
receiving the PSS, the SSS and the PBCH that form the given block,
wherein the PSS and the SSS are located in a first frequency domain,
wherein the PBCH is located in at least part of a second frequency domain that is broader than the first frequency domain,
wherein the PBCH is located in at least part of a first given domain neighboring the SSS in the frequency direction in the given block and the PBCH is not located in a second given domain neighboring the PSS in the frequency direction in the given block,
wherein a first part of the PBCH is located in the second frequency domain in a symbol other than that for the PSS and the SSS and a second part of the PBCH is located in at least part of the first given domain in a symbol that is the same as that for the SSS, and
wherein the PBCH is not located in a symbol that is the same as that for the PSS.

11. A system comprising a terminal and a base station, wherein:
the terminal comprises:
a processor of the terminal that controls reception of a first synchronization signal (PSS), a second synchronization signal (SSS), and a broadcast channel (PBCH) in a given block that is formed by a given number of symbols and a given number of subcarriers; and
a receiver that receives the PSS, the SSS and the PBCH that form the given block,
wherein the PSS and the SSS are located in a first frequency domain,
wherein the PBCH is located in at least part of a second frequency domain that is broader than the first frequency domain,
wherein the PBCH is located in at least part of a first given domain neighboring the SSS in the frequency direction in the given block and the PBCH is not located in a second given domain neighboring the PSS in the frequency direction in the given block,
wherein a first part of the PBCH is located in the second frequency domain in a symbol other than that for the PSS and the SSS and a second part of the PBCH is located in at least part of the first given domain in a symbol that is the same as that for the SSS, and
wherein the PBCH is not located in a symbol that is the same as that for the PSS; and
the base station comprises:
a processor of the base station that controls transmission of the PSS, the SSS, and the PBCH in the given block; and
a transmitter that transmits the PSS, the SSS, and the PBCH that form the given block.

* * * * *